United States Patent [19]

Shepard et al.

[11] 4,020,319

[45] * Apr. 26, 1977

[54] METHOD OF FORMING A KNITTING NEEDLE LATCH PIVOT

[75] Inventors: Richard Wilton Shepard; Albert Sidney Ashmead, both of Torrington, Conn.

[73] Assignee: The Torrington Company, Torrington, Conn.

[ * ] Notice: The portion of the term of this patent subsequent to Jan. 20, 1993, has been disclaimed.

[22] Filed: Oct. 28, 1975

[21] Appl. No.: 625,837

Related U.S. Application Data

[63] Continuation-in-part of Ser. No. 440,459, Feb. 7, 1974, Pat. No. 3,934,109.

[52] U.S. Cl. .................................... 219/121 LM
[51] Int. Cl.² .................................... B23K 9/00
[58] Field of Search ... 219/121 L, 121 LM, 121 EM; 163/3, 5; 66/121, 122; 350/7, 299; 331/94.5 C

[56] References Cited

UNITED STATES PATENTS

| 3,230,475 | 1/1966 | Koester et al. ............... 331/94.5 C |
| 3,729,248 | 4/1973 | Beduchaud ...................... 350/7 |

*Primary Examiner*—Bruce A. Reynolds
*Assistant Examiner*—Fred E. Bell
*Attorney, Agent, or Firm*—Frank S. Troidl

[57] ABSTRACT

High energy heat, such as the high energy obtained from a laser or a maser, is applied against both wall portions of a latch pivot formed by displacing portions of the opposite walls of the slot in the needle. The applied high energy heat melts portions of the displaced portions of the walls so that when the melted metal solidifies a unified integral pivot is formed having the same chemical composition throughout.

3 Claims, 7 Drawing Figures

U.S. Patent  April 26, 1977  4,020,319
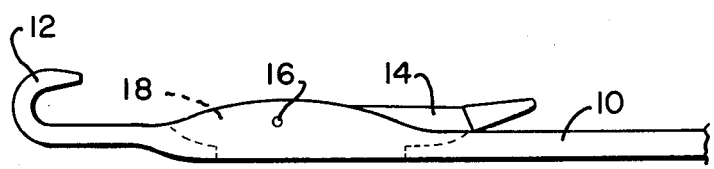
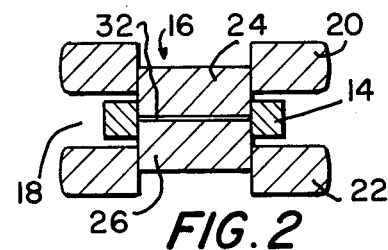
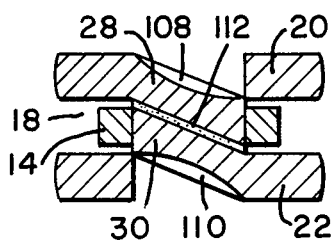
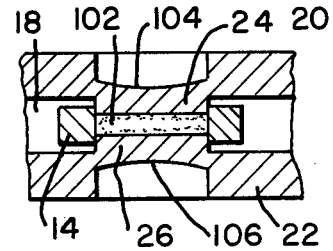
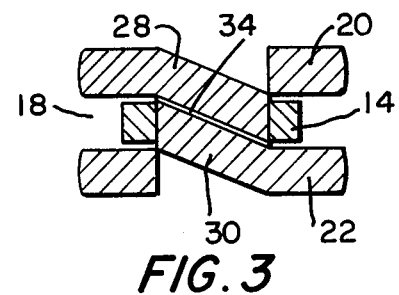
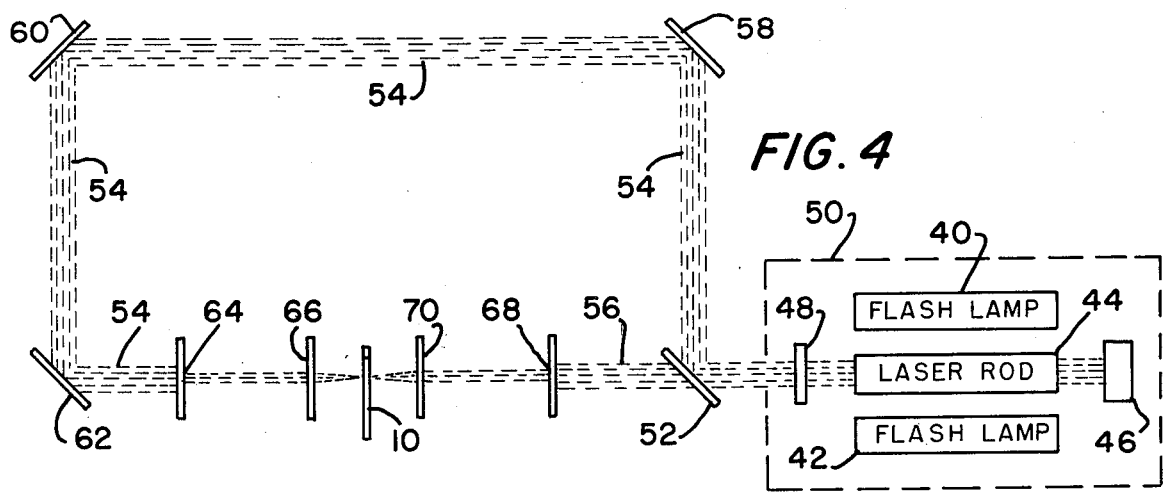
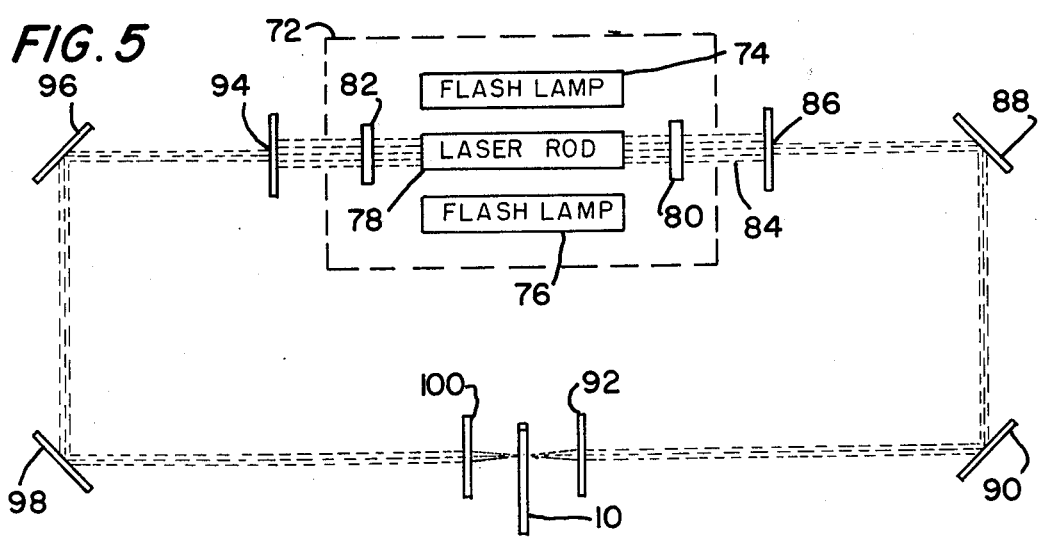

METHOD OF FORMING A KNITTING NEEDLE LATCH PIVOT

This application is a continuation-in-part of our co-pending application Ser. No. 440,459 filed Feb. 7, 1974, entitled LATCH PIVOT FOR LATCH NEEDLE now U.S. Pat. No. 3,934,109.

This invention relates to knitting machine needles. More particularly, this invention is a new and improved method for making a latch pivot.

Current methods of making latch pivots include using a pair of punches to displace a portion of the side walls of the blade of the latch needle adjacent the latch slot. The side walls are punched inwardly after the latch is placed into the latch slot, and the latch pivot hole is aligned with the punches so that the displaced portion of the side walls will extend into the latch pivot hole. The displaced portions may be completely displaced or angularly displaced.

Such currently made latch pivots have many advantages over the old screw rivet type. However, in rough service, high speeds and tight loops, the latch tends to spread the cheeks. This sometimes causes fatigue failures. In addition, the needle may be slightly spread open leaving the latch with less support than it should have. In tightly arranged knitting elements such a latch may strike adjacent elements which it should clear. This leads to wear in areas not intended. Also such extra loose latches do not always behave exactly as do proper support latches. For such reasons, it would be desirable to fuse the two displaced portions together. However, to properly fuse the two portions together is very difficult. This is so, among other things, because the latch is already in place when the two sides of the latch slot are displaced. The latch completely covers the very area you desire to fuse together.

Our invention is a novel method for fusing together the displaced portions after the latch needle is completely assembled with the latch pivotally mounted on the displaced portions. The resulting latch pivot is an integral pivot which consists of a homogenous single material.

Briefly described, the new method of forming a latch pivot for the latch of a latch needle includes applying a high energy heat beam against each of the wall portions which have been displaced into the pivot hole of the latch. High energy laser beams or maser beams may be used quite effectively. The beams melt portions of the displaced portions of the walls and when the melted portions solidify in the space between the two displaced portions, a pivot is formed.

The invention, as well as its many advantages, may be further understood by reference to the following detailed description and drawings in which:

FIG. 1 is a side elevational view, showing a portion of a typical latch needle;

FIG. 2 is an enlarged sectional view, showing a regular pressed latch pivot;

FIG. 3 is a view similar to FIG. 2, but showing an angular pressed latch pivot;

FIG. 4 is a schematic representation of one method of forming our new latch needle latch pivot;

FIG. 5 is a schematic representation of a second method of forming our new latch needle latch pivot;

FIG. 6 is an enlarged sectional view showing the new needle formed from the needle of FIG. 2 after the use of our new method of forming a latch needle latch pivot; and FIG. 7 is a view similar to FIG. 6 showing the new latch needle formed from the latch needle of FIG. 3.

Like parts in the various figures are referred to by like numbers.

Referring to the drawings, FIG. 1, the latch needle includes a blade 10 with a hook 12 on the end of the blade. The latch 14 pivots about pivot 16 extending transversely along a slot 18.

FIG. 2 is an enlarged sectional view of the regular pressed pivot. The latch pivot is formed by placing the latch 14 with the pivot hole of the latch in the proper position within the slot 18. The sides 20 and 22 of the blade 10 are then punched to form the displaced opposite side cylindrical portions 24 and 26. The displaced opposite side cylindrical portions 24 and 26 extend into the pivot hole of the latch 14 and are parallel to the longitudinal axis of the metal blade.

The angular pressed pivot shown in FIG. 3 is formed by a slightly different shaped punch from the shape of the punch used to form the regular pressed pivot of FIG. 2. In the angular pressed pivot, the cylindrical portions 28 and 30 are angular with respect to the longitudinal axis of the metal blade.

Unfortunately, a space such as space 32 in FIG. 2 or space 34 in FIG. 3 usually exists between the two displaced portions. Spaces 32 and 34 are exaggerated in FIG. 2 and FIG. 3 respectively for clarity. The spaces usually run from 0.001 to 0.002 inches. The space is caused by the spring back of the metal after the displaced portions are formed by the punch. Previous attempts to weld or fuse the displaced portions together have never been completely satisfactory. Electrical discharge methods often weld segments of the needle not desired or fail to weld the notcontacting displaced portions. If the needles are mechanically closed together to assure contact of the displaced portions, the latch is often so pinched as to retard its motion. Heat sources other than electricity have been tried but none have proved sufficiently accurate or reliable.

Our new method comprises applying controlled heat from a high energy heat source against both displaced side wall portions to melt at least a portion of each of the side wall portions. The method metal flows into the space between the side wall portions and then is allowed to solidify to fuse the two displaced wall portions together.

Since these latch needles are very small, it is necessary that the heat source be such as to provide the required and very well defined, accurate, intense heat source. It is now possible to use certain types of laser beams to provide such required very well defined, and accurate heat concentration. It is also possible to use a maser beam. Certain types of electronic beams may also be used.

One method of applying a high energy laser beam to both sides of the latch needle to form the new latch pivot is shown in FIG. 4. Flash lamps 40 and 42 surrounding laser rod 44 and mirrors 46 and 48 are included as part of the laser box 50. When the flash lamps 40, 42 fire, they energize the laser 44. The light bounces back and forth in the rod, and is reflected back into it repeatedly by the end mirrors 46 and 48. During this bouncing, the light is amplified, becoming more and more intense. Mirror 46 is a dense solid mirror, it will reflect but no light can possibly get through. Mirror 48 is a partial mirror, it will reflect up to a certain intensity level but above that level, it will pass the light.

When the required energy level is reached, mirror 48 transmits and the laser "fires" the light passing through mirror 48. The light impinges upon a 50—50 beam splitter 52. The beam splitter splits the laser beam into two separate beams 54 and 56 of approximately equal intensity or energy. Beam 54 is successively reflected by reflecting mirrors 58, 60, and 62; and then passes through aperture 64, and through lens 66, and then focused on one of the displaced portions of the needle 10. Laser beam 56 passes through the beam splitter 52, through aperture 68 and through lens 70 and is focused on the other displaced portion of the needle 10.

Preferably, the displaced portions of the needle 10 are offset slightly from the focal point of the laser beams. When this is done, holes are not drilled into the displaced portions, but the displaced portions are melted at least partially; and the melted metal flows into the space separating the displaced portions; and the melted metal then solidifies to form the unified latch pivot.

A better, simpler and most preferred present form of laser is shown schematically in FIG. 5. We have found that it is possible to build a laser which can shoot out of both ends. Such a laser can be made by using two mirrors which are exactly equal. The flash lamps 74 and 76 in laser box 72 and the laser rod 78 operate in the same manner as the flash lamps and laser rod shown in FIG. 4. However, when a particular predetermined energy level is obtained, equal amounts of high energy heat are transmitted through identical mirrors 80 and 82. And the laser rod 78 fires out of both ends. The laser beams transmitted through identical mirrors 80 and 82 go through identical paths to the latch needle 10. Identical optical paths make a much simpler machine. The laser beam 84 passing through mirror 80 is reduced in size by aperture 86 so that the laser beam has the desired size for the optical image to be focused on the needle 10. The beam is successively reflected by mirrors 88, 90 and then the beam is focused on one displaced portion of the needle 10 by the lens 92. Similarly, the beam transmitted through mirror 82 is reduced in size by aperture 94 and then successively reflected by mirrors 96 and 98, and then focused by lens 100 on the other displaced portion of the needle 10. As with the embodiment FIG. 4, the focused beams could be focused with the displaced portions at the focal point, but preferably the displaced portions are slightly out of focus.

FIG. 6 shows an enlarged view of the solid pivot formed by applying our new method to the displaced portions shown in FIG. 2. The inwardly displaced portions 24 and 26 which have been hit by the laser beams, each have a portion of its metal melted; and when the metal portions solidify the solidified portion indicated by the number 102 and greatly exaggerated for clarity, is fused to the portions 24 and 26 leaving a concave shape 104 on displaced portion 24 and a concave shaped 106 on displaced portion 26. The portion 102 of course is made by the melted parts of displaced portions 24 and 26 flowing into the space between the two and solidifying. Thus the metal portion 102 consists of the same material and the same metal as the material and metal of portions 24 and 26.

FIG. 7 shows the resulting solid pivot from the angular pressed pivot shown in FIG. 3. A concave shape 108 is formed on the outside of displaced portion 28 and a concave shape 110 is formed on the outside of displaced portion 30. The concave shapes 108 and 110 result from the flow of melted metal into the space between the displaced portions 28 and 30. The solidified melted metal 112 forms the final unitary homogenous solid latch pivot.

We claim:

1. In a method of forming a latch pivot for a latch needle, having portions of the opposite walls of the slot in the needle displaced into a pivot hole of the latch with a space between the displaced portions and with spaces separating the latch from each of the opposite walls of the slot, the improvement comprising the steps of: simultaneously applying controlled heat from a high energy heat source against both displaced wall portions to at least melt a portion of said displaced wall portions so that molten metal is formed in the space between the two displaced wall portions; the extent of the molten metal being controlled to substantially fill said space without contacting the latch and allowing the molten metal to solidify to fuse the displaced wall portions together without changing the spaces separating the latch from each of the opposite walls of the slot.

2. The method of forming a latch pivot for a latch needle in accordance with claim 1 wherein: the high energy heat source is a laser, the laser energy is fired from one side of the laser, the light from the laser is divided into approximately equal parts, with one of said equal parts being directed against one displaced wall portion, and the other of said equal parts being directed against the other displaced wall portion.

3. The method of forming a latch pivot for a latch needle in accordance with claim 1 wherein: the high energy heat source is a laser, the laser is fired from both ends, with an equal amount of energy coming from each end, and the energy from one end of the laser is applied against one displaced wall portion and the energy from the other end of the laser is applied against the other displaced wall portion.

* * * * *